United States Patent [19]

Yamashita

[11] Patent Number: 4,905,784
[45] Date of Patent: Mar. 6, 1990

[54] POWER-ASSISTED STEERING SYSTEM FOR AUTOMOTIVE VEHICLE

[75] Inventor: Masato Yamashita, Toyota, Japan

[73] Assignee: Toyota Jidosha Kabushiki Kaisha, Aichi, Japan

[21] Appl. No.: 321,285

[22] Filed: Mar. 9, 1989

[30] Foreign Application Priority Data

Mar. 10, 1988 [JP] Japan .................................. 63-57224

[51] Int. Cl.⁴ .............................................. B62D 5/08
[52] U.S. Cl. .................................... 180/143; 91/375 A
[58] Field of Search ................ 180/143, 141, 142, 132; 91/375 A, 434

[56] References Cited

U.S. PATENT DOCUMENTS 4,765,428  8/1988  Kawakami et al. .................. 180/143

Primary Examiner—Charles A. Marmor
Assistant Examiner—Donn McGiehan
Attorney, Agent, or Firm—Oliff & Berridge

[57] ABSTRACT

A power-assisted steering system includes a changeover valve unit comprising an input member arranged to be applied with the driver's steering effort and a valve assembly disposed between a hydraulic pump and a hydraulic power cylinder to control the supply of fluid under pressure from the pump to the power cylinder in response to movement of the input member, and a hydraulic reaction mechanism associated with the valve assembly to apply a reaction force to the input member in accordance with a hydraulic reaction pressure applie thereto. The reaction mechanism includes a reaction fluid chamber to be supplied with fluid under pressure from the pump respectively through a fired throttle and a flow control valve. The flow control valve is arranged to act as a fixed throttle valve when the pressure of fluid from the pump is lower than a predetermined value and to act as a constant flow control valve when the pressure of fluid from the pump becomes larger than the predetermined value. The system is arranged to increase the hydraulic pressure in the reaction fluid chamber in accordance with an increase of travel speed of the vehicle.

4 Claims, 2 Drawing Sheets

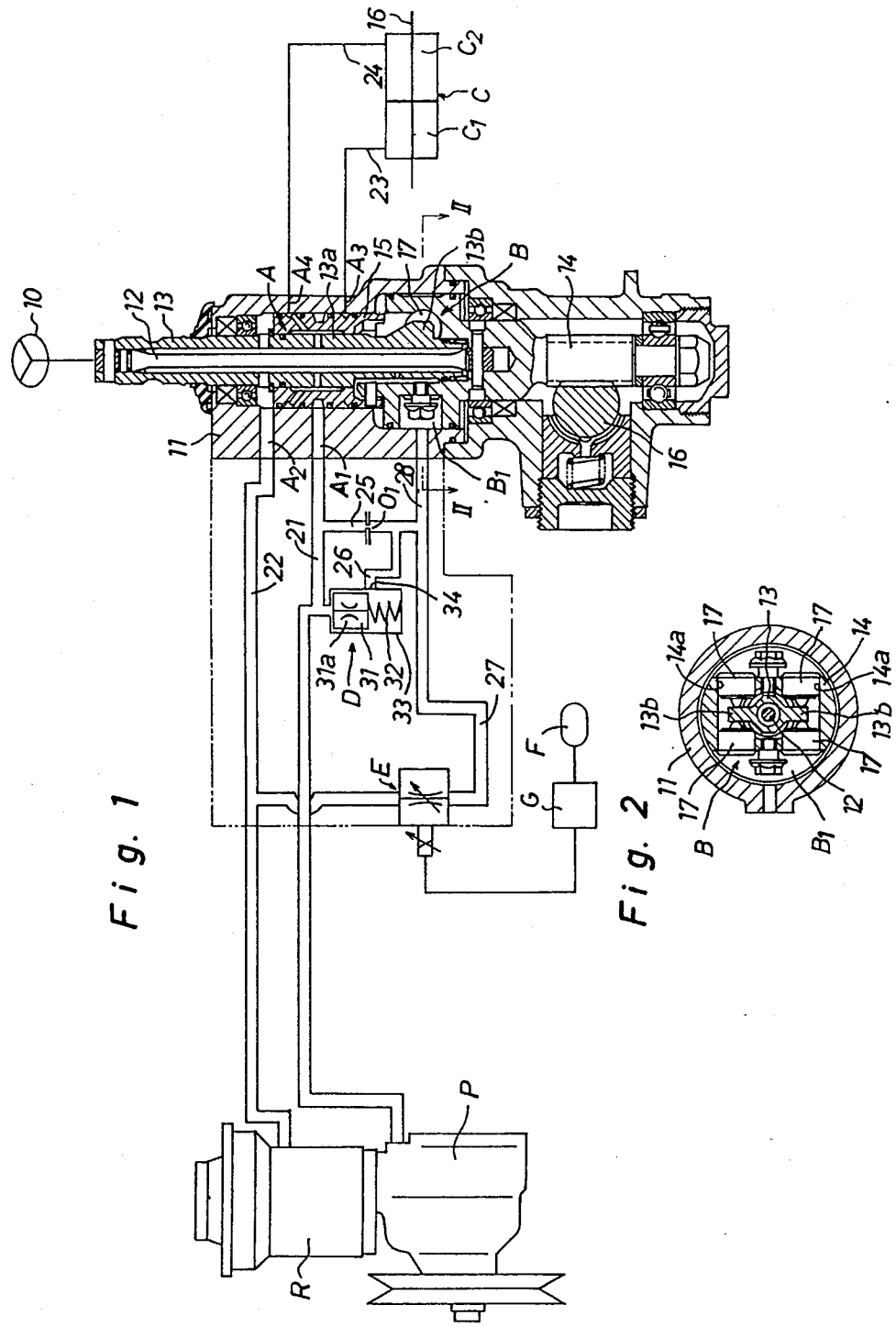

POWER-ASSISTED STEERING SYSTEM FOR AUTOMOTIVE VEHICLE

BACKGROUND OF THE INVENTION

1. Field of the Invention

The present invention relates to a power-assisted steering system for automotive vehicles, and more particularly to a power-assisted steering system of the type which includes a hydraulic reaction mechanism for applying a reaction force to the driver's steering effort in accordance with travel speed of the vehicle.

2. Description of the Prior Art

Disclosed in Japanese Patent Publication No. 49-30659 is a power-assisted steering system of this kind wherein hydraulic fluid under pressure from a hydraulic fluid pump is supplied through a fixed orifice into a hydraulic reaction mechanism in a changeover valve unit and is controlled in pressure in accordance with travel speed of the vehicle. FIG. 5 illustrates a relationship between the driver's steering effort and the pressure of hydraulic fluid supplied into a power cylinder under control of the changeover valve unit. In the right-hand part of FIG. 5, there are illustrated a relationship between various steering angles in relation to travel speed of the vehicle. For applying a natural and appropriate reaction force to the driver's steering effort during travel of the vehicle at low and high speed, it is necessary to provide a linear relationship between the driver's steering effort and the power cylinder pressure and to moderate a rise gradient of the power cylinder pressure relative to the driver's steering effort in accordance with an increase of the vehicle speed. In a region where turning maneuvers of the vehicle are effected at a large steering angle under a high gravity or in an emergency, it is necessary to cause a quick increase of the power cylinder pressure to reduce the driver's steering effort.

In the case that appropriate control of the power cylinder pressure may not be effected in accordance with the type of vehicles a sudden change in the driver's steering effort will occur in turning maneuvers of the vehicle. This causes an unstable feel in steering operation and results in excessive turning of the vehicle. In the steering system, however, it is unable to restrain a sudden increase of the power cylinder pressure in turning maneuvers of the vehicle, and it is also unable to control the rise gradient of the power cylinder pressure in accordance with travel speed of the vehicle.

SUMMARY OF THE INVENTION

It is, therefore, a primary object of the present invention to provide an improved power-assisted steering system which is capable of controlling the rise gradient of the power cylinder pressure in accordance with travel speed of the vehicle and of restraining the sudden increase of the power cylinder pressure in turning maneuvers of the vehicle.

According to the present invention, the primary object is attained by providing a power-assisted steering system which comprises a hydraulic pump driven by a prime mover of the vehicle for supply of fluid under pressure, a hydraulic power cylinder operatively connected to the drigible road wheels of the vehicle, a changeover valve unit including an input member arranged to be moved by the driver's steering effort applied thereto, and valve means for controlling the supply of fluid under pressure from the pump to the power cylinder in response to movement of the input member, a hydraulic reaction mechanism associated with the changeover valve unit to apply a reaction force to the input member in accordance with a hydraulic reaction pressure applied thereto, the reaction mechanism including a reaction fluid chamber to be applied with the hydraulic reaction pressure, a fixed throttle disposed within a first shunt circuit between a first fluid circuit connecting the pump to the valve means of the changeover valve unit and a second fluid circuit connecting the reaction fluid chamber to a fluid reservoir, first flow control valve means disposed within a second shunt circuit between said first and second fluid circuits, the first control valve means being arranged to act as a fixed throttle when the pressure in the first fluid circuit is lower than a predetermined value and to act as a constant flow control valve when the pressure in the first fluid circuit becomes higher than the predetermined value, and second flow control valve means disposed within the second fluid circuit to decrease the flow quantity of fluid discharged therethrough into the fluid reservoir in accordance with an increase of travel speed of the vehicle thereby increasing the hydraulic reaction pressure in the reaction fluid chamber.

In a practical embodiment of the present invention, the first flow control valve means may include a valve body disposed within the second shunt circuit, a valve spool movably disposed in the valve body to be applied with the pressure in the first fluid circuit and being formed with a fixed orifice for throttling the flow of fluid under pressure supplied therethrough into the second fluid circuit from the first fluid circuit, a spring arranged to bias the valve spool against the pressure in the first fluid circuit, and a variable throttle cooperable with the valve spool for permitting a predetermined quantity of fluid under pressure supplied therethrough into the second fluid circuit from the fixed orifice.

BRIEF DESCRIPTION OF THE DRAWINGS

Additional objects, features and advantages of the present invention will be more readily appreciated from the following detailed description of a preferred embodiment thereof when considered with reference to the accompanying drawings, in which:

FIG. 1 is a schematic illustration of a power-assisted steering system in accordance with the present invention;

FIG. 2 is a cross-sectional view taken along line II—II in FIG. 1, illustrating a hydraulic reaction mechanism in a changeover valve unit adapted to the steering system;

DESCRIPTION OF THE PREFERRED EMBODIMENT

Figure 3:
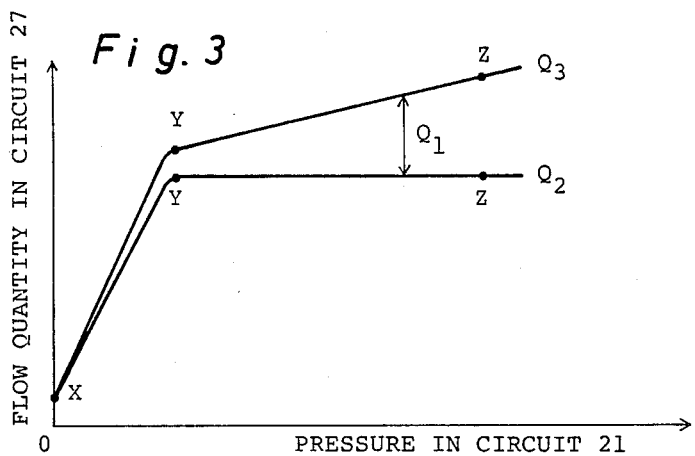
FIG. 3 is a graph illustrating a relationship between the pressure of hydraulic fluid supplied into a power cylinder and the quantity of hydraulic fluid supplied into a fluid reaction chamber of the changeover valve unit shown in FIG. 1.

In FIG. 1 of the drawings, there is illustrated a changeover valve unit of the rack and pinion type adapted to a power-assisted steering system in an automotive vehicle. The changeover valve unit includes a rotary valve assembly A for controlling the supply of hydraulic fluid under pressure to a hydraulic power cylinder C associated with the steering system and a hydraulic reaction mechanism B for applying a reaction force to the driver's steering effort in accordance with travel speed of the vehicle. The rotary valve assembly A comprises a valve housing 11, input and output shafts 13 and 14 arranged for relative rotation on aligned axes within the valve housing 11, a torsion bar 12 interconnecting the input and output shafts 13 and 14, a valve rotor 13a integral with the input shaft 13, and a valve sleeve 15 rotatably mounted within the valve housing 11 in surrounding relationship with the valve rotor 13a. The valve sleeve 15 is connected with the output shaft 14 for rotation therewith and cooperates with the valve rotor 13a to selectively supply fluid under pressure from a hydraulic fluid pump P to opposite fluid chambers $C_1$, $C_2$ of the hydraulic power cylinder C in response to relative rotation between the input and output shafts 13 and 14.

The valve housing 11 is provided with an inlet port $A_1$ connected to a discharge port of the fluid pump P by way of a fluid circuit 21, an exhaust port $A_2$ connected to a fluid reservoir R of the fluid pump P by way of a fluid circuit 22 and a pair of ports $A_3$, $A_4$ respectively connected to the opposite fluid chambers $C_1$ and $C_2$ of power cylinder C by way of fluid circuits 23 and 24. The input shaft 13 is operatively connected to a steering wheel 10 to be applied with the driver's steering effort. The output shaft 14 is in the form of a pinion shaft permanently in mesh with a rack bar 16 which is integrally connected to a power piston in the hydraulic power cylinder C in a usual manner. The rack bar 16 is further operatively connected to a pair of dirigible road wheels of the vehicle through a standard linkage mechanism (not shown). The fluid pump P is arranged to be driven by a prime mover of the vehicle for discharging a large amount of hydraulic fluid under pressure.

When the valve rotor 13a is maintained in a neutral position, fluid under pressure from the pump P is supplied to the inlet port $A_1$ of rotary valve assembly A through the fluid circuit 21 and is circulated into the fluid reservoir R through the exhaust port $A_2$ and fluid circuit 22. When relative rotation occurs between the input and output shafts 13 and 14, the valve rotor 13a cooperates with the valve sleeve 15 to selectively supply fluid under pressure from the pump P to one of the fluid chambers $C_1$, $C_2$ in power cylinder C across one of the ports $A_3$, $A_4$ and one of the fluid circuits 23, 24 and to permit the flow of fluid discharged from the other fluid chamber $C_2$ or $C_1$ into the fluid reservoir R across the other fluid circuit 24 or 23, port $A_4$ or $A_3$, port $A_2$ and fluid circuit 22. This will provide a hydraulic power assist to the driver's steering effort applied to the input shaft 13 during turning maneuvers of the vehicle.

As shown in FIGS. 1 and 2, the hydraulic reaction mechanism B includes two pairs of opposed pistons 17 which are axially slidably disposed within a pair of parallel radial bores 14a formed in an upper end portion of the output pinion shaft 14. The pistons 17 are each applied with a hydraulic reaction pressure in a reaction fluid chamber $B_1$ which is formed between the valve housing 11 and the upper end portion of output pinion shaft 14. The hydraulic reaction mechanism B further includes a pair of radial arms 13b which are integrally formed with a lower end portion of input shaft 13 and disposed between each pair of pistons 17. The reaction fluid chamber $B_1$ is connected to the fluid reservoir R by way of fluid circuits 28 and 27. The fluid circuits 27, 28 are connected to the fluid circuit 21 through shunt circuits 25 and 26. A fixed orifice or throttle $O_1$ is disposed within the shunt circuit 25 to throttle the flow of fluid under pressure supplied therethrough from the fluid circuit 21 into the fluid circuits 27 and 28, and a flow control valve D of the bypass type is disposed within the shunt circuit 26 to control the flow quantity of fluid under pressure supplied therethrough from the fluid circuit 21 into the fluid circuits 27 and 28.

The flow control valve D includes a valve spool 31 formed with a fixed orifice or throttle 31a, a coil spring 32 arranged to bias the valve spool 31 against the pressure applied thereto from fluid circuit 21, and a valve body 33 formed to contain the valve spool 31 and spring 32 and to provide a variable throttle 34 cooperable with the valve spool 31. In a condition where a difference in pressure caused by the fixed orifice 31a is less than the load of spring 32, the valve spool 31 is positioned in place to make the opening area of variable throttle 34 larger than that of fixed orifice 31a thereby to make only the fixed orifice 31a effective. When the difference in pressure caused by fixed orifice 31a increases due to an increase of hydraulic pressure in circuit 21, the valve spool 31 is moved against the load of spring 32 so that the variable throttle 34 acts to permit a predetermined quantity of fluid under pressure supplied therethrough from the fixed orifice 31a into the fluid circuits 27 and 28. In this instance, the flow control valve D acts as a constant flow control valve of the fixed orifice in-line type.

In the steering system, an electrically operated variable throttle valve E is disposed within the fluid circuit 27 and connected to an electric control unit G which is connected to a commercially available speed sensor F to produce therefrom an electric control signal indicative of travel speed of the vehicle. When applied with the control signal, the variable throttle valve E is energized to decrease the quantity of fluid discharged therethrough into the fluid circuit 22 in accordance with an increase of the vehicle speed thereby to increase the hydraulic pressure in the fluid reaction chamber $B_1$.

Figure 4:
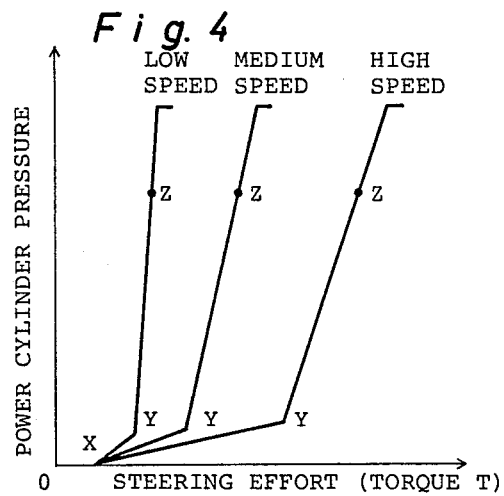
FIG. 4 is a graph illustrating a relationship between a driver's steering effort and a power cylinder pressure.
Figure 5:
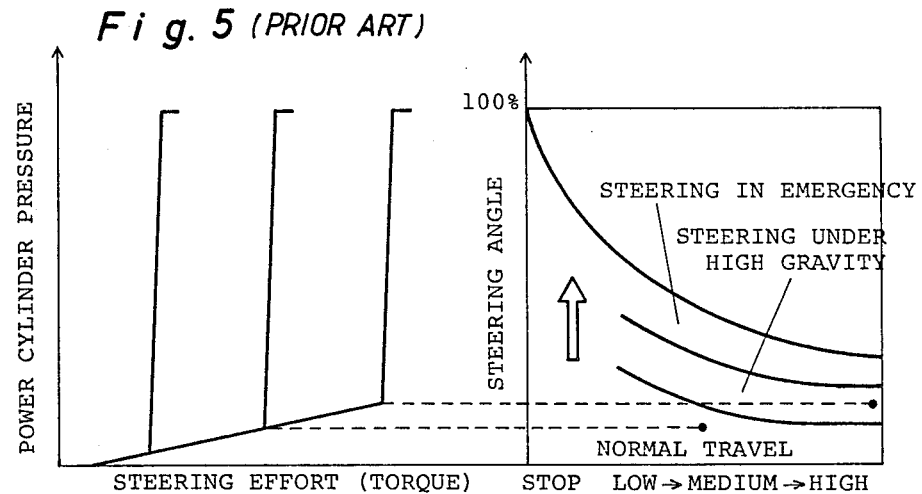
FIG. 5 is a graph illustrating a relationship between a driver's steering effort and a power cylinder pressure in the prior art steering system.

Assuming that the input shaft 13 is not applied with any steering torque during straight travel of the vehicle, the rotary valve assembly A is maintained in an open condition to permit the flow of fluid under pressure circulating therethrough from the pump P into the fluid reservoir R. In such a condition, the fixed orifices 31a and $O_1$ act to restrict the flow of fluid under pressure in reaction fluid chamber $B_1$ approximately zero, as shown by O-X in FIGS. 3 and 4, respectively.

When the rotary valve assembly A is operated by a steering torque T applied thereto to increase the hydraulic pressure in fluid circuit 21, the fluid circuits 27, 28 are supplied with the fluid under pressure from the fluid circuit 21 through the fixed orifice $O_1$ in shunt circuit 25 and through the flow control valve D in shunt circuit 26. The flow quantity $Q_1$ of fluid across the fixed orifice $O_1$ and the flow quantity $Q_w$ of fluid across the flow quantity conotrol valve D will increase in accordance with an increase of the steering torque applied to the rotary valve assembly A. In a low pressure region where the pressure in fluid circuit 21 is maintained at a low level, the difference in pressure caused by fixed orifice 31a is maintained less than the load of spring 32, and the valve spool 31 is retained in place to make only the fixed orifice 31a effective. Thus, the flow quantity $Q_2$ of fluid across shunt circuit 26 as well as the flow quantity $Q_1$ of fluid across shunt circuit 25 increases in proportion to an increase of the pressure in fluid circuit 21, and the flow quantity $Q_3$ of fluid in circuits 27, 28 increases as shown by X-Y in FIG. 3. As a result, the reaction mechanism B is applied with a hydraulic reaction pressure from the fluid circuits 27, 28 under control of the fixed orifices $O_1$ 31a to moderate an increase of the power cylinder pressure relative to the steering torque T. Simultaneously, the variable throttle valve E is energized by an electric control signal applied thereto to decrease the flow quantity of fluid discharged therethrough into the fluid circuit 22 in accordance with an increase of the vehicle speed. Thus, the hydraulic reaction pressure in fluid chamber $B_1$ increases to moderate the rise gradient of the power cylinder pressure in accordance with an increase of the vehicle speed, as shown by X-Y in FIG. 4.

In a high pressure region where the difference in pressure caused by fixed orifice 31a becomes larger than the load of spring 32, the valve spool 31 is moved against the spring 32 so that the variable throttle 34 acts to permit a predetermined quantity of fluid under pressure supplied therethrough from the fixed orifice 31a into the fluid circuits 27 and 28. Thus, the flow quantity $Q_2$ of fluid across shunt circuit 26 is maintained in the predetermined value as shown by Y-Z in FIG. 3, and the flow quantity $Q_3$ of fluid in circuits 27, 28 increase due to an increase of the flow quantity of fluid across the fixed orifice $O_1$. As a result, the hydraulic reaction pressure in fluid chamber $B_1$ gradually increases to cause a quick increase of the power cylinder pressure responsive to an increase of the steering torque T. Simultaneously, the variable throttle valve E is energized by an electric control signal applied thereto to decrease the flow quantity of fluid discharged therethrough into the circuit 22 in accordance with an increase of the vehicle speed. Thus, the hydraulic reaction pressure in fluid chamber $B_1$ increases to moderate the rise gradient of the power cylinder pressure in accordance with an increase of the vehicle speed, as shown by Y-Z in FIG. 4.

In the steering system, the opening area of orifice $O_1$ may be enlarged to increase the flow quantity $Q_1$ of fluid across shunt circuit 25. This is effective to further moderate the rise gradient of the power cylinder pressure shown by Y-Z in FIG. 4. The load of spring 32 in flow control valve D may be adjusted to control the pressure level at which the variable throttle 34 becomes effective to permit the predetermined quantity of fluid supplied therethrough into the fluid circuits 27, 28. This is effective to adjust the pressure level indicated by the character Y in FIGS. 3 and 4.

In a practical embodiment of the present invention, the changeover valve unit of the rack and pinion type may be replaced with a power-assisted steering device of the recirculating ball type. Alternatively, the rotary valve assembly A in the changeover valve unit may be replaced with a spool valve assembly. Although in the above embodiment the hydraulic reaction mechanism has been adapted to apply a reaction force to the input shaft 13 of the changeover valve unit, it may be replaced with another hydraulic reaction mechanism arranged to apply a hydraulic reaction force to the driver's steering effort in an appropriate manner.

Having now fully set forth both structure and operation of a preferred embodiment of the concept underlying the present invention, various other embodiments as well as certain modifications of the embodiment herein shown ard described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power-assisted steering system in an automotive vehicle, comprising:
   a hydraulic pump driven by a prime mover of the vehicle for supply of fluid under pressure;
   a hydraulic power cylinder operatively connected to the dirigible road wheels of the vehicle;
   a changeover valve unit including an input member arranged to be moved by the driver's steering effort applied thereto, and valve means for controlling the supply of fluid under pressure from said pump to said power cylinder in response to movement of the input member;
   a hydraulic reaction mechanism associated with said changeover valve unit to apply a reaction force to said input member in accordance with a hydraulic reaction pressure applied thereto, said reaction mechanism including a reaction fluid chamber to be applied with the hydraulic reaction pressure;
   a fixed throttle disposed within a first shunt circuit between a first fluid circuit connecting said pump to said valve means of said changeover valve unit and a second fluid circuit connecting said reaction fluid chamber to a fluid reservoir;
   first flow control valve means disposed within a second shunt circuit between said first and second fluid circuits, said first flow control valve means being arranged to act as a fixed throttle when the pressure in said first fluid circuit is lower than a predetermined value and to act as a constant flow control valve when the pressure in said first fluid circuit becomes higher than the predetermined value; and
   second flow control valve means disposed within said second fluid circuit to decrease the flow quantity of fluid discharged therethrough into said fluid reservoir in accordance with an increase of travel speed of the vehicle thereby increasing the hydraulic reaction pressure in said reaction fluid chamber.

2. A power-assisted steering system as recited in claim 1, wherein said first flow control valve means includes a valve body disposed within said second shunt circuit, a valve spool movably disposed in said valve body to be applied with the pressure in said first fluid circuit and being formed with a fixed orifice for throttling the flow of fluid under pressure supplied therethrough into said second fluid circuit from said first fluid circuit, a spring arranged to bias said valve spool against the pressure in said first fluid circuit, and a variable throttle cooperable with said valve spool for permitting a predetermined quantity of fluid under pressure supplied therethrough into said second fluid circuit from said fixed orifice.

3. A power-assisted steering system as recited in claim 1, wherein said second shunt circuit is connected to said first shunt circuit downstream of said fixed throttle.

4. A power-assisted steering system as recited in claim 1, wherein said second flow control valve means is an electrically operated variable throttle valve disposed within said second fluid circuit to be energized by an electric control signal indicative of travel speed of the vehicle.

* * * * *